(12) United States Patent
Konada et al.

(10) Patent No.: US 11,872,861 B2
(45) Date of Patent: Jan. 16, 2024

(54) ACTIVE SUSPENSION DEVICE AND CONTROL DEVICE FOR SUSPENSION

(71) Applicant: HONDA MOTOR CO., LTD., Tokyo (JP)

(72) Inventors: Kazuya Konada, Wako (JP); Takashi Yanagi, Wako (JP); Ryosuke Yamazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 154 days.

(21) Appl. No.: 17/680,626

(22) Filed: Feb. 25, 2022

(65) Prior Publication Data
US 2022/0305868 A1 Sep. 29, 2022

(30) Foreign Application Priority Data
Mar. 25, 2021 (JP) ................. 2021-051008

(51) Int. Cl.
*B60G 17/0165* (2006.01)
*B60G 17/019* (2006.01)

(52) U.S. Cl.
CPC ....... *B60G 17/0165* (2013.01); *B60G 17/019* (2013.01); *B60G 2400/821* (2013.01); *B60G 2401/14* (2013.01); *B60G 2401/174* (2013.01); *B60G 2401/21* (2013.01)

(58) Field of Classification Search
CPC .............. B60G 17/0165; B60G 17/019; B60G 2400/821; B60G 2401/14; B60G 2401/142; B60G 2401/1174; B60G 2401/21

USPC ........................................................ 701/37, 38
See application file for complete search history.

(56) References Cited

U.S. PATENT DOCUMENTS

| 10,363,790 B2 * | 7/2019 | Hoffmann | B60G 17/02 |
| 2010/0138108 A1 * | 6/2010 | Kajino | B60G 17/016 701/38 |
| 2014/0195112 A1 * | 7/2014 | Lu | B60G 17/015 703/2 |
| 2014/0303844 A1 * | 10/2014 | Hoffmann | B60G 17/08 701/37 |
| 2016/0325753 A1 * | 11/2016 | Stein | B60W 50/0097 |
| 2021/0283969 A1 * | 9/2021 | Danielson | B60G 17/0165 |

FOREIGN PATENT DOCUMENTS

JP   H05-96922 A   4/1993

* cited by examiner

*Primary Examiner* — Erick R Solis
(74) *Attorney, Agent, or Firm* — Rankin, Hill & Clark LLP

(57) ABSTRACT

An ECU includes: a road surface height measurer which measures road surface heights at three or more points along a vehicle-width direction in front of a tire mounted on a wheel; a position detector which detects a position at which a difference of the road surface height from an adjacent road surface height is equal to or larger than a predetermined threshold among the road surface heights at three or more points measured by the road surface height measurer; and a corrector which corrects the road surface height at a position at which the difference detected by the position detector is equal to or larger than the predetermined threshold to a predetermined height.

6 Claims, 7 Drawing Sheets

ACTIVE SUSPENSION DEVICE AND CONTROL DEVICE FOR SUSPENSION

BACKGROUND OF THE INVENTION

1. Field of the Invention

The present invention relates to an active suspension device and a control device for suspension.

2. Description of the Related Art

Patent Literature 1 discloses "a control device for active suspension which detects, and stores in time-series, a displacement X of a road surface and a vertical acceleration G at a front end of a vehicle body, and which estimates a displacement of the road surface when a vehicle passes therethrough from the displacement X, and controls actuators of front wheels and rear wheels depending on the estimated displacement of the road surface when detection of the displacement is normal, and which estimates a vertical acceleration of a part of the vehicle body corresponding to the rear wheels from the vertical acceleration G based on a wheel base Lw and a vehicle speed, and controls the actuator of the rear wheels depending on the estimated vertical acceleration when the detection of the displacement is abnormal" (see for example the abstract of Patent Literature 1).

Patent Literature 1: JP H05-096922 A

In the control device for active suspension disclosed in Patent Literature 1, a controller determines whether or not the detection of displacement by a road surface detector is normal, and when it is determined that the detection of displacement is normal, the controller estimates the displacement of the road surface when the vehicle travels for a predicted distance from the displacement of the road surface stored in a storage based on at least the predicted distance and the vehicle speed, and controls the actuators depending on the estimated displacement of the road surface.

On the other hand, when it is determined that the detection of the displacement is abnormal, the controller estimates the vertical acceleration of a part of the vehicle body corresponding to the rear wheels when the vehicle travels for a distance of the wheel base from the vertical acceleration stored in the storage based on the wheel base and the vehicle speed, and controls the actuator of the rear wheels depending on the estimated vertical acceleration.

As described above, since when it is determined that the detection of the displacement is abnormal, the actuator of the rear wheels is controlled depending on the vertical acceleration estimated from the vertical acceleration stored in the storage, there is a risk that the ride comfort of an occupant of the car deteriorates.

SUMMARY OF THE INVENTION

The present invention solves the above-described conventional problem, and has an object to provide an active suspension device and a control device for suspension which are capable of preventing a ride comfort of an occupant of a car from deteriorating.

An active suspension device according to the present invention is a control device for a variable damping force damper provided for damping a relative vibration between a vehicle body and a wheel, including: a road surface height measurer which measures road surface heights at three or more points along a vehicle-width direction in front of a tire mounted on the wheel; a position detector which detects a position at which a difference of the road surface height from an adjacent road surface height is equal to or larger than a predetermined threshold among the road surface heights at three or more points measured by the road surface height measurer; and a corrector which corrects the road surface height at a position at which the difference detected by the position detector is equal to or larger than the predetermined threshold to a predetermined height.

According to the present invention, it is possible to provide an active suspension device and a control device for suspension which are capable of preventing a ride comfort of an occupant of a car from deteriorating.

DETAILED DESCRIPTION OF THE EMBODIMENTS

Hereinafter, embodiments of the present invention will be described in detail. Note that the embodiments described below are examples for implementing the present invention and should be modified or changed as appropriate depending on the configurations of devices to which the present invention is applied and on various conditions, and the present invention is not limited to the following embodiments. In addition, parts of the embodiments described below may be combined as appropriate.

Figure 1:
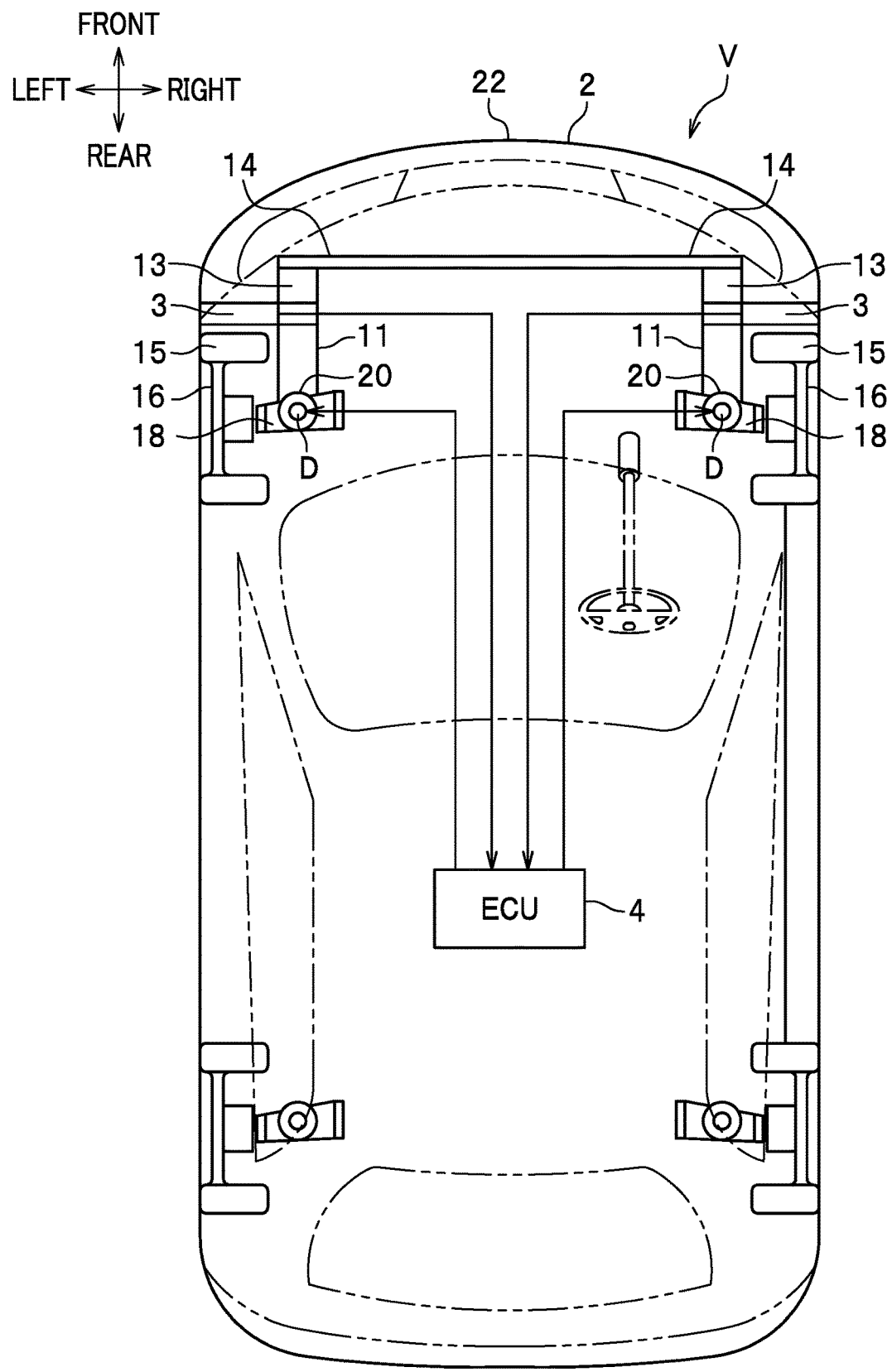
FIG. 1 shows a schematic configuration view of a vehicle to which a suspension control device according to an embodiment of the present invention is applied.
Figure 2:
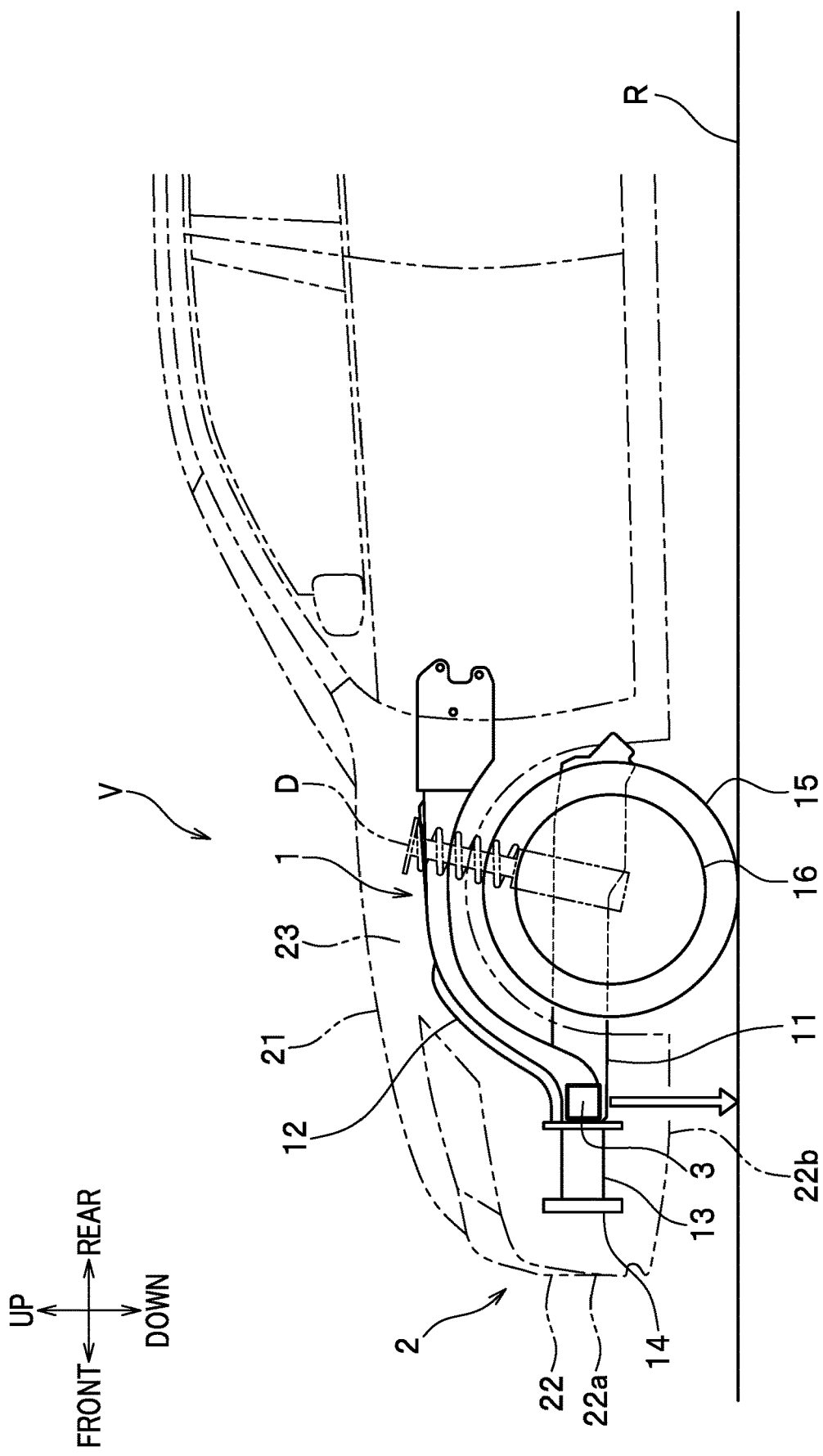
FIG. 2 is a side view of the vehicle showing an attachment structure of a sensor in the present embodiment.

FIG. 1 shows a schematic configuration view of a vehicle V to which a suspension control device according to an embodiment of the present invention is applied. FIG. 2 is a side view of the vehicle V showing an attachment structure of a sensor 3 in the present embodiment. Note that the contour of the vehicle V is indicated by dashed-two dotted lines in FIG. 2.

As shown in FIG. 1 or FIG. 2, the vehicle (car) V includes a vehicle-body member 1, an exterior member 2, sensors 3, and an ECU (Electronic Control Unit) 4. The model or type of the vehicle V is not particularly limited as long as the vehicle V is a car including the vehicle-body member 1, the exterior member 2, the sensors 3, and the ECU 4. In other words, the vehicle V is a passenger vehicle, a bus, a truck, a service vehicle, or the like.

In the vehicle-body member 1 of the vehicle V, wheels 16 equipped with tires 15 are arranged as front wheels. Each wheel 16 of the front wheels is suspended on the exterior member 2 by means of a suspension composed of a suspension arm 18, a spring 20, a variable damping force damper (hereinafter simply referred to as the damper D), and the like. Note that the present embodiment will be described with an electromagnetic damper as an example, but is not limited to this, and may be applied to an air suspension and an active suspension using an active stabilizer. In addition, although the present embodiment will be described with the front wheel as an example, the same configuration as the wheel 16 of the front wheel may be employed for the wheels of the rear wheels.

As shown in FIG. 2, the vehicle-body member 1 supports the exterior member 2 and includes front side frames 11, upper members 12, bumper beam extensions 13, a bumper beam 14 (frame member), and the like.

The exterior member 2 is a member that forms the exterior part (exterior shell) of the vehicle V. The exterior member 2 includes an engine hood 21, a front bumper 22 (bumper), and front fenders 23. The engine hood 21 is a panel member that covers the upper face in front of the windshield. The front bumper 22 is located on the front face side of the vehicle V and is composed of a panel member made of a synthetic resin, for example. In addition, the front bumper 22 includes a front face portion 22a, which is provided with an air intake and the like, and a bottom face portion 22b, which extends rearward from the lower end of the front face portion 22a. The front fenders 23 are panel members that cover the surroundings of the wheels 16.

As shown in FIG. 1 and FIG. 2, the sensor 3 is a sensor for damper control that detects the condition of the road surface R (road surface condition) in front of the vehicle V to control the damper D of the vehicle V. The sensor 3 acquires information on the heights of the road surface at three or more points. The sensor 3 is fixed to the upper member 12 (see FIG. 2) which is located in front of the wheel 16. The sensor 3 in the present embodiment is configured to detect the condition of the road surface R immediately ahead of the wheel 16 as indicated by the solid-line arrow in FIG. 2, and may be selected as appropriate from sensors of radar system, camera system, laser system, and the like. In addition, the sensor 3 is not limited to a single sensor, but may be configured by combining sensors of multiple systems, like a camera system and a laser system.

The ECU 4 (active suspension device) shown in FIG. 1 is a device that controls the damper D, which is provided for damping a relative vibration between the vehicle-body member 1 and the wheel 16. In the present embodiment, a road surface condition detector is composed of the sensor 3 and the ECU 4.

The ECU 4 is composed of a microcomputer, a ROM, a RAM, a peripheral circuit, an input-output interface, various drivers, and the like. The ECU 4 is electrically coupled to each sensor 3 and the damper D of each wheel 16 through a communication line (for example, a controller area network (CAN): not shown). In addition, a suspension control device (control device for suspension) is composed of the ECU 4 and the sensor 3. In other words, the suspension control device is configured to control suspension including the damper D, where the road surface condition detector is composed of the sensor 3 and the ECU 4.

In the present embodiment, the damper D is composed of, for example, a monotube-type (de Carbon-type) damper. In this damper D, a piston rod is housed in a tubular cylinder filled with a magneto-rheological fluid (MRF) such that the piston rod is slidable in an axial direction, and a piston mounted on the front end of the piston rod partitions the inside of the cylinder into an upper fluid chamber and a lower fluid chamber. Between the upper fluid chamber and the lower fluid chamber, a communication passage through which the upper fluid chamber and the lower fluid chamber communicate with each other is provided. Inside the communication passage, an MLV coil is disposed. In the damper D, for example, the lower end of the cylinder is coupled to the suspension arm 18, which is a wheel-side member, and the upper end of the piston rod is coupled to a damper base, which is a vehicle body-side member.

In addition, once a current is supplied to the MLV coil, which is not shown, of the damper D by the ECU 4, a magnetic field is applied to the MRF flowing through the communication passage, and a chain cluster of ferromagnetic particles is formed. This increases the apparent viscosity of the MRF passing through the communication passage to increase the damping force of the damper D. Note that although a monotube-type damper is employed as the damper D in the present embodiment, dampers of other types may be employed as appropriate.

Figure 3:
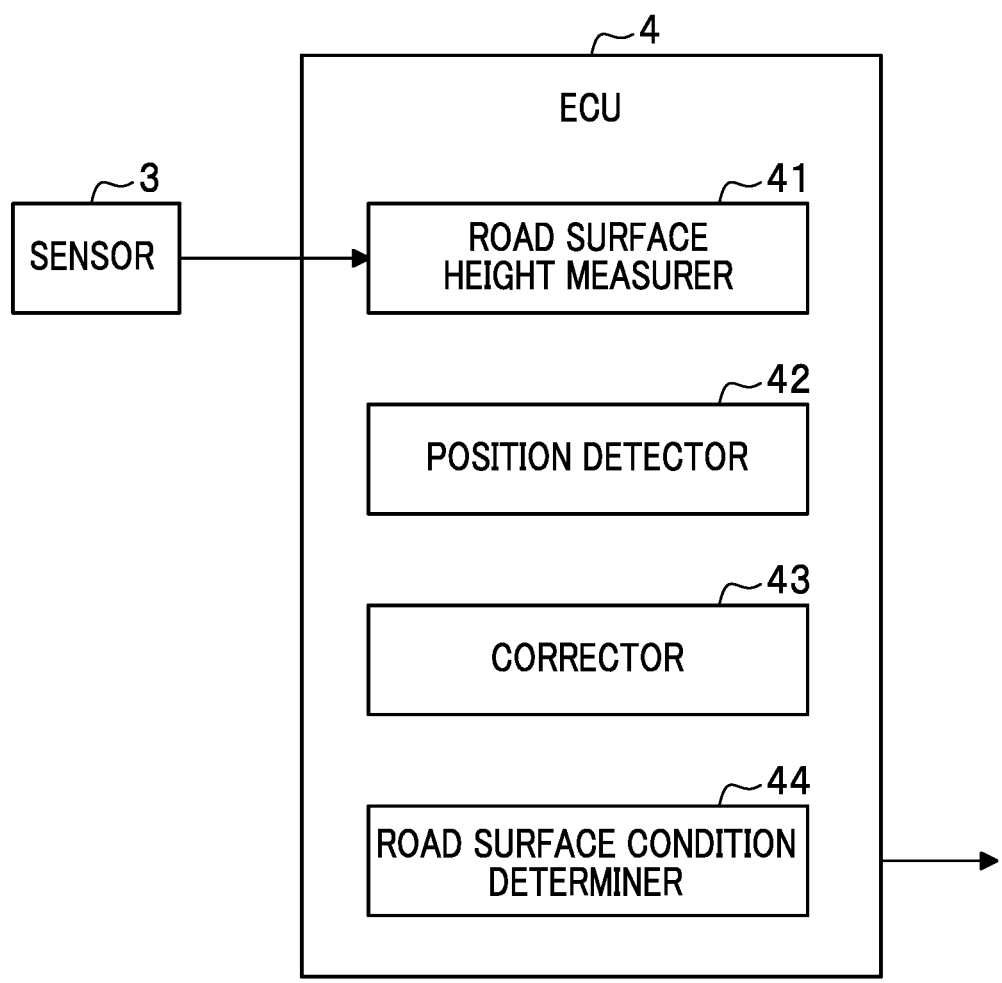
FIG. 3 is a functional block diagram showing functions of an ECU according to the present embodiment.

FIG. 3 is a functional block diagram showing functions of the ECU 4 according to the present embodiment. The ECU 4 functions as a road surface height measurer 41, a position detector 42, a corrector 43, and a road surface condition determiner 44 by executing programs stored in the not-shown ROM.

The road surface height measurer 41 measures road surface heights at three or more points along a vehicle-width direction in front of the tire 15 mounted on the wheel 16. For example, the sensor 3 acquires information on the road surface heights at three or more points. The sensor 3 acquires reflected light of laser from the road surface R to detect the condition of the road surface R (road surface condition) in front of the vehicle V. In this way, the road surface height measurer 41 acquires the road surface condition from the sensor 3 and measures the road surface heights at three or more points along the vehicle-width direction in front of the tire 15 mounted on the wheel 16.

The position detector 42 detects a position at which a difference of the road surface height from an adjacent road surface height is equal to or larger than a predetermined threshold among the road surface heights at three or more points measured by the road surface height measurer 41.

Figure 4A:
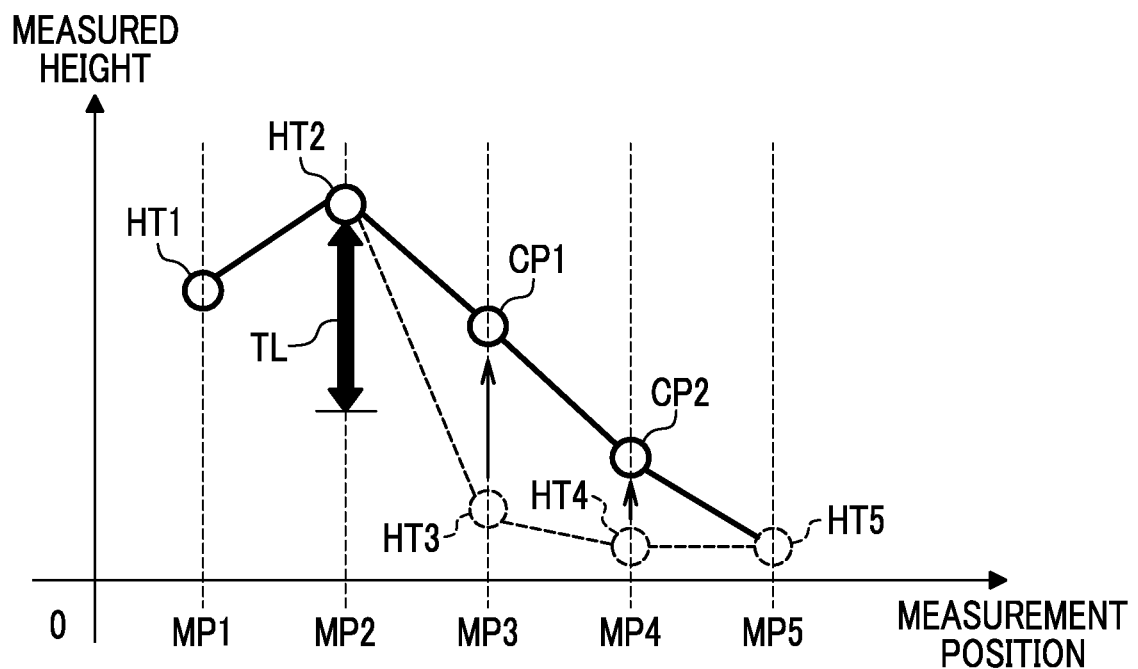
FIG. 4A is an explanatory diagram showing a measurement result in which a position detector measured road surface heights along a vehicle-width direction in front of a tire.

FIG. 4A is an explanatory diagram showing a measurement result in which the position detector 42 measured road surface heights along the vehicle-width direction in front of the tire 15.

As shown in FIG. 4A, the horizontal axis indicates the width direction of the tire 15, and the vertical axis indicates the road surface height in front of the tire 15. That is, FIG. 4A shows road surface heights HT1 to HT5 at measurement points MP1 to MP5 in front of the tire 15.

The corrector 43 corrects a road surface height at a position at which the difference detected by the position detector 42 is equal to or larger than the predetermined threshold TL to a predetermined height. For example, the corrector 43 corrects the road surface heights HT3, HT4 at positions at which the difference detected by the position detector 42 is equal to or larger than the predetermined threshold TL to predetermined heights CP1, CP2.

Specifically, the corrector 43 corrects the road surface heights HT3, HT4 the differences of which from the road surface height HT2 of the measurement point MP2 are equal to or larger than the predetermined threshold TL to limit values known in advance up to which the tire 15 is deformable (hereinafter referred to as deformation limits). Note that the configuration in which the corrector 43 corrects road surface heights to limit values up to which the tire 15 is deformable is an example of the present embodiment, and the present embodiment is not limited to this.

Figure 4B:
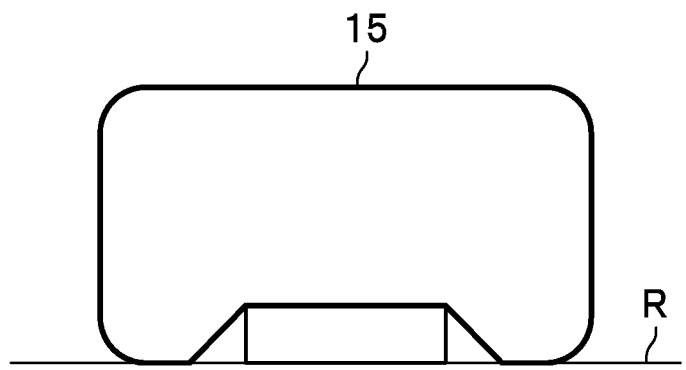
FIG. 4B is an explanatory diagram showing a concept in which a corrector corrects to a limit value up to which the tire is deformable.

FIG. 4B is an explanatory diagram (tire deformation model) showing the concept in which the corrector 43 corrects road surface heights to the limit values up to which the tire 15 is deformable. The tire deformation model shown in FIG. 4B indicates that when a measured road surface height exceeds the deformation limit of the tire 15 on the road surface R, the corrector 43 corrects the measured road surface height to the deformation limit of the tire 15.

For example, in FIG. 4A, when differences between the road surface height HT2 at the measurement point MP2 and the road surface heights HT3, HT4 at the measurement points MP3, MP4 exceed the predetermined threshold TL, the corrector 43 corrects the road surface height HT3 at the measurement point MP3 to the predetermined height CP1 (the deformation limit of the tire deformation model) which indicates a limit value up to which the tire 15 is deformable, and also corrects the road surface height HT4 at the measurement point MP4 to the predetermined height CP2 (the deformation limit of the tire deformation model) which indicates a limit value up to which the tire 15 is deformable.

On the other hand, the road surface condition determiner 44 (see FIG. 3) excludes a value of the road surface height at a position at which the difference detected by the position detector 42 is equal to or larger than the predetermined threshold TL, and determines a condition of the road surface based on the road surface heights at positions at each of which the difference from an adjacent road surface height is smaller than the predetermined threshold. Note that the corrector 43 and the road surface condition determiner 44 may be combined with each other to be used as optional constituent elements.

In the case where the ECU 4 includes the road surface condition determiner 44, the corrector 43 corrects the excluded value of the road surface height at a position at which the difference is equal to or larger than the predetermined threshold TL based on the road surface heights at positions at each of which the difference from an adjacent road surface heights is smaller than the predetermined threshold TL. Here, examples in which the corrector 43 performs correction will be described using FIG. 5A to FIG. 5D.

Figure 5A:
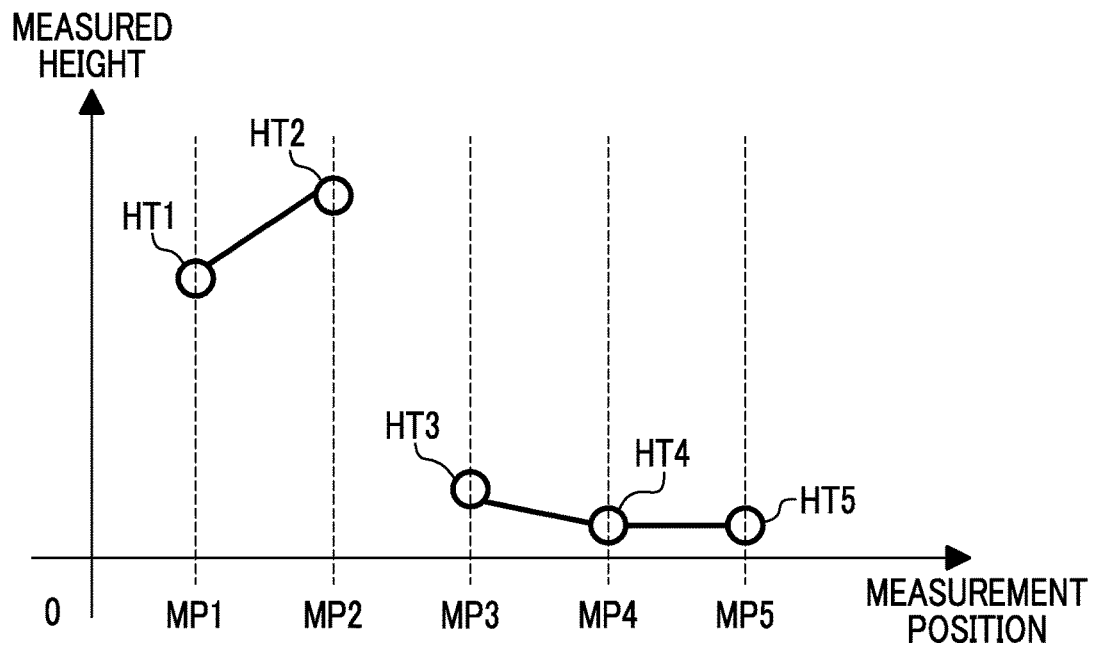
FIG. 5A is an explanatory diagram showing a measurement result of measuring road surface heights at a certain time.

FIG. 5A is an explanatory diagram showing a measurement result (road surface heights HT1 to HT5) of measuring road surface heights at a certain time. FIG. 5A shows that there is no measurement point at which the difference of the road surface height from an adjacent road surface height is equal to or larger than a predetermined threshold in measurement points MP1 to MP5, for example.

In this case, in the present embodiment, the ECU 4 uses the road surface heights HT1 to HT5 at the respective measurement points MP1 to MP5 in FIG. 5A as values for controlling the damper D.

Figure 5B:
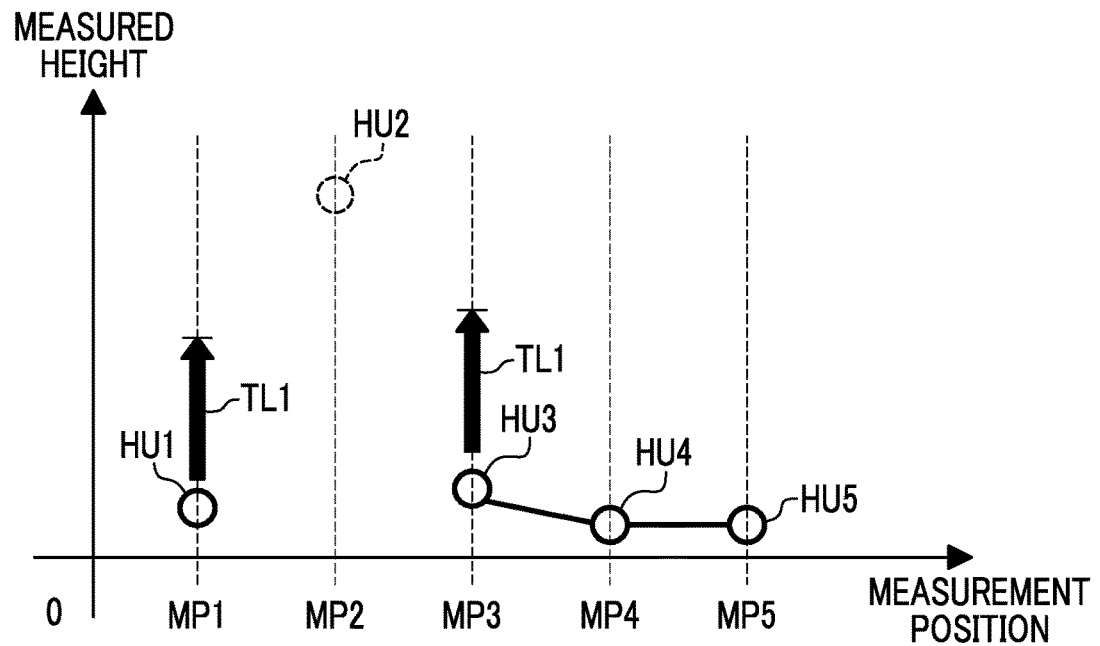
FIG. 5B is an explanatory diagram showing a measurement result of measuring road surface heights at a different time (No. 1)

FIG. 5B is an explanatory diagram showing a measurement result (road surface heights HU1 to HU5) of measuring road surface heights at a different time. As shown in FIG. 5B, in the measurement points MP1 to MP5, for example, the difference of the road surface height HU2 at the measurement point MP2 from the adjacent road surface height HU1 (or the road surface height HU3) is equal to or larger than a first threshold TL1 (predetermined threshold). In this case, the road surface condition determiner 44 excludes the value of the road surface height HU2 at the measurement point MP2, and determines the condition of the road surface based on the road surface heights HU1, HU3, HU4, HU5 at the positions at each of which the difference from the adjacent road surface height is smaller than the first threshold TL1.

Hence, the corrector 43 corrects the excluded value of the road surface height HU2 at the measurement point MP2 at which the difference is equal to or larger than the first threshold TL1 based on the road surface heights HU1, HU3, HU4, HU5 at positions at each of which the difference from the adjacent road surface height is smaller than the first threshold TL1. That is, the corrector 43 corrects the value of the road surface height HU2 at the measurement point MP2 such that the difference from the road surface height HU1 (the adjacent road surface height) becomes smaller than the first threshold TL1.

In this way, in the present embodiment, the ECU 4 uses the road surface heights HU1, HU3, HU4, HU5 in FIG. 5B and the corrected value of the road surface height HU2 at the measurement point MP2 as values for controlling the damper D.

Figure 5C:
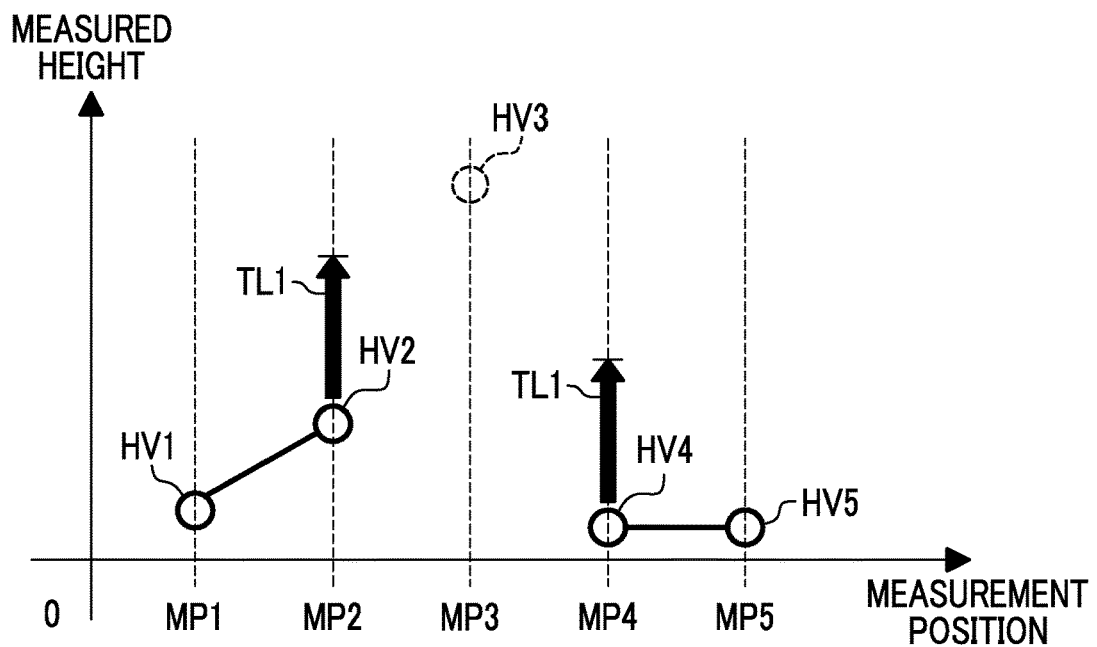
FIG. 5C is an explanatory diagram showing a measurement result of measuring road surface heights at a different time (No. 2)

FIG. 5C is an explanatory diagram showing a measurement result (road surface heights HV1 to HV5) of measuring road surface heights at a different time. As shown in FIG. 5C, in the measurement points MP1 to MP5, for example, the difference of the road surface height HV3 at the measurement point MP3 from the adjacent road surface height HV2 (or the road surface height HV4) is equal to or larger than the first threshold TL1. In this case, the road surface condition determiner 44 excludes the value of the road surface height HV3 at the measurement point MP3, and determines the condition of the road surface based on the road surface heights HV1, HV2, HV4, HV5 at the positions at each of which the difference from the adjacent road surface height is smaller than the first threshold TL1.

Hence, the corrector 43 corrects the excluded value of the road surface height HV3 at the measurement point MP3 at which the difference is equal to or larger than the first threshold TL1 based on the road surface heights HV1, HV2, HV4, HV5 at positions at each of which the difference from the adjacent road surface height is smaller than the first threshold TL1. That is, the corrector 43 corrects the value of the road surface height HV3 at the measurement point MP3 such that the difference from the road surface height HV2 (the adjacent road surface height) becomes smaller than the first threshold TL1.

In this way, in the present embodiment, the ECU 4 uses the road surface heights HV1, HV2, HV4, HV5 in FIG. 5C and the corrected value of the road surface height HV3 at the measurement point MP3 as values for controlling the damper D.

Figure 5D:
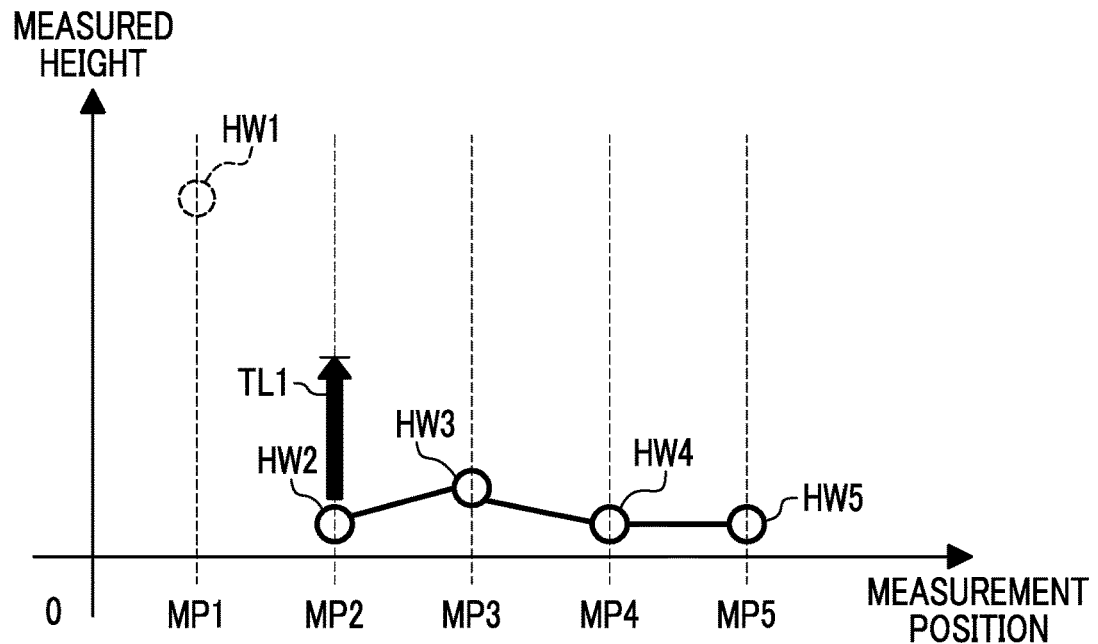
FIG. 5D is an explanatory diagram showing a measurement result of measuring road surface heights at a different time (No. 3)

FIG. 5D is an explanatory diagram showing a measurement result (road surface heights HW1 to HW5) of measuring road surface heights at a different time. As shown in FIG. 5D, in the measurement points MP1 to MP5, for example, the difference of the road surface height HW1 at the measurement point MP1 from the adjacent road surface height HW2 is equal to or larger than the first threshold TL1. In this case, the road surface condition determiner 44 excludes the value of the road surface height HW1 at the measurement point MP1, and determines the condition of the road surface based on the road surface heights HW2, HW3, HW4, HW5 at the positions at each of which the difference from the adjacent road surface heights is smaller than the first threshold TL1.

Hence, the corrector 43 corrects the excluded value of the road surface height HW1 at the measurement point MP1 at which the difference is equal to or larger than the first threshold TL1 based on the road surface heights HW2, HW3, HW4, HW5 at positions at each of which the difference from the adjacent road surface height is smaller than the first threshold TL1. That is, the corrector 43 corrects the value of the road surface height HW1 at the measurement point MP1 such that the difference from the road surface height HW2 (the adjacent road surface height) becomes smaller than the first threshold TL1.

Hence, in the present embodiment, the ECU 4 uses the road surface heights HW2, HW3, HW4, HW5 in FIG. 5D and the corrected value of the road surface height HW1 at the measurement point MP1 as values for controlling the damper D.

In this way, in the case where one road surface height is different from an adjacent road surface height by the first threshold TL1 or more, the ECU 4 can exclude the value of the one road surface height, and determine the condition of the road surface based on the other road surface heights at positions at each of which the difference is smaller than the first threshold TL1. In this case, the measurement points are not limited regardless of which of the right side and the left side of the tire 15 they are on as long as the road surface heights are adjacent.

Moreover, for the case where there is one point at which the difference from an adjacent road surface height is equal to or larger than the predetermined threshold and the case where there are two points at each of which the difference from an adjacent road surface height is equal to or larger than the predetermined threshold, the position detector 42 may be such that a second threshold for detecting the differences in road surface height at two points is set to be larger than the first threshold for detecting difference in road surface height at one point. Here, a relation between the first threshold and the second threshold will be described in detail with comparison between these thresholds with reference to the drawings.

Figure 6A:
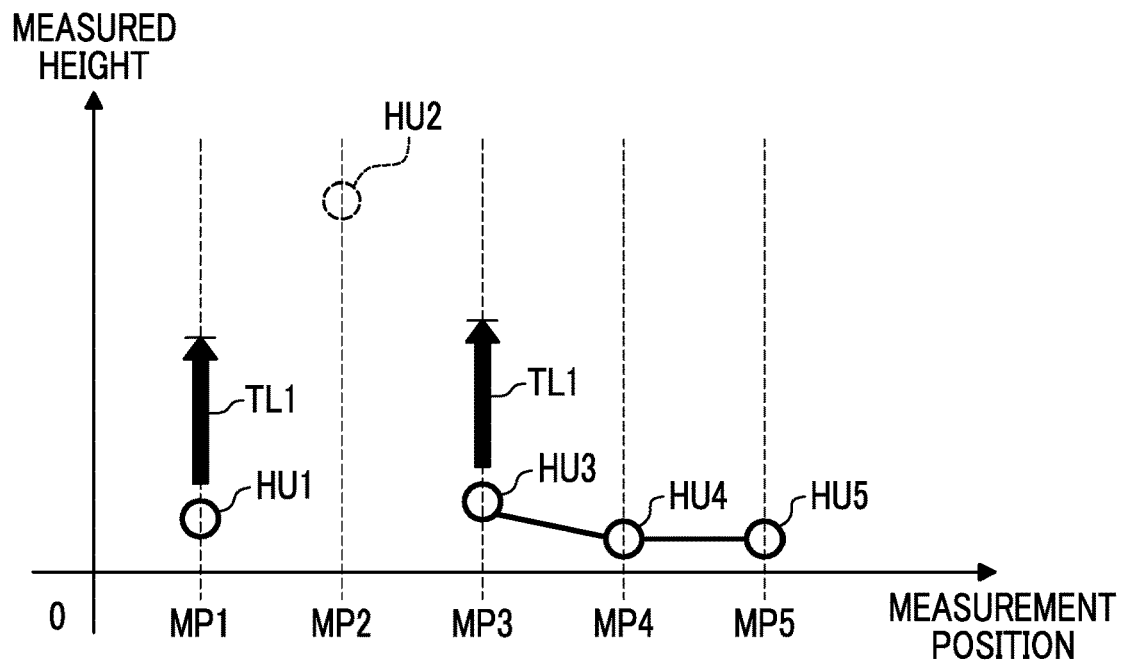
FIG. 6A is an explanatory diagram showing that a difference of a value of a road surface height at one point from road surface heights at adjacent measurement points is larger than a first threshold.
Figure 6B:
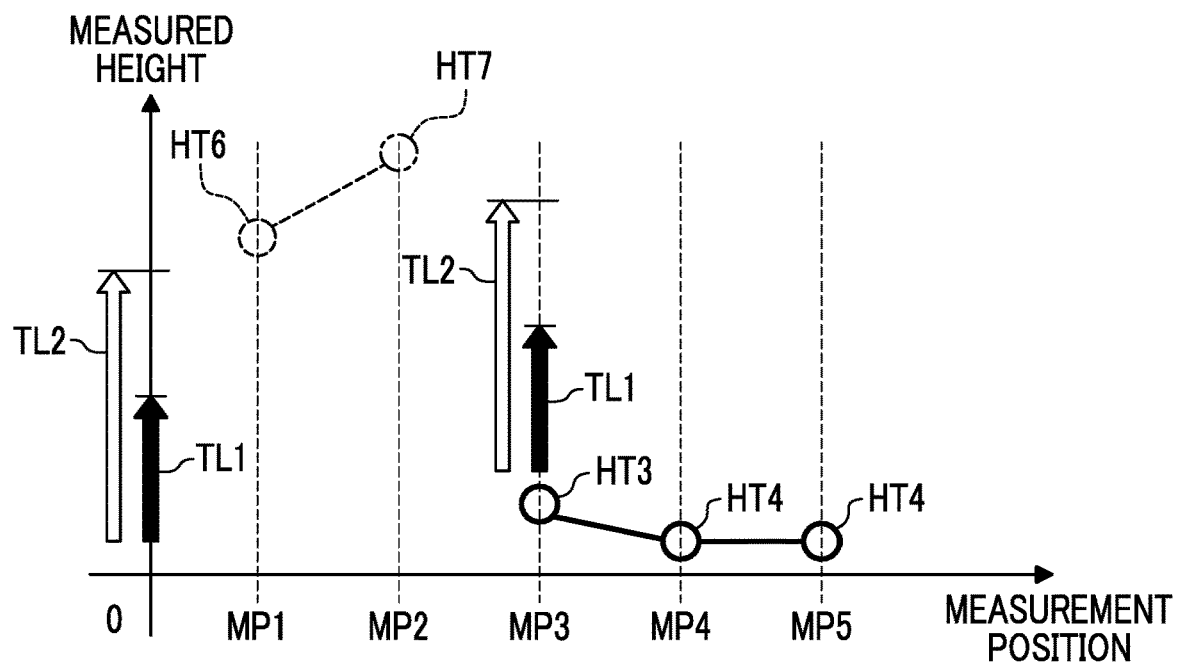
FIG. 6B is an explanatory diagram showing that each of differences of values of road surface heights at two points respectively from road surface heights at adjacent measurement points is equal to or larger than a predetermined threshold.

FIG. 6A shows that a difference of the value of the road surface height HU2 at one point from the adjacent road surface heights HU1, HU3 at the measurement points MP1, MP3 is larger than the first threshold TL1. On the other hand, FIG. 6B shows each of differences of the values of the road surface heights HT6, HT7 at two points respectively from the road surface heights 0, HT3 at the adjacent measurement points 0, MP3 is equal to or larger than a predetermined threshold. Note that parts in FIG. 6A and FIG. 6B which are common with FIG. 5A and FIG. 5B are denoted by the same reference signs, and the description of such parts will be omitted. In addition, the first threshold TL1 and the second threshold TL2 are variable.

In FIG. 6A, since the difference of the road surface height HU2 from the adjacent road surface height HU1 or road surface height HU3 is larger than the first threshold TL1, the road surface height HU2 is excluded as an outlier point from the road surface heights used for determining the condition of the road surface.

On the other hand, in FIG. 6B, the position detector 42 detects two points of the road surface heights HT6, HT7 as positions at each of which the difference from the adjacent road surface height is equal to or larger than the predetermined threshold. In this case, as shown in FIG. 6B, the position detector 42 sets the second threshold TL2 for detecting differences in road surface height at two points to be larger than the first threshold TL1 for detecting a difference in road surface height at one point. This enables the position detector 42 to make the road surface heights HT6, HT7 at two points less likely to be excluded as outlier points than in the case of the road surface height HT6, HT7 at one point.

Here, for example, if the first threshold TL1 and the second threshold TL2 were the same value, the road surface condition determiner 44 would detect the road surface heights HT6, HT7 at adjacent two points shown in FIG. 6B as outlier points, which is unfavorable in consideration of the actual road surface heights.

In view of this, the position detector 42 can make each of the values of the road surface heights HT6, HT7 at the adjacent two points less likely to be detected as an outlier point by making the second threshold TL2 for detecting differences in road surface height at two points larger than the first threshold TL1 for detecting a difference in road surface height at one point.

In this way, the road surface condition determiner 44 can avoid excluding the road surface heights HT6, HT7 at the adjacent two points as outlier points, and accordingly the ECU 4 can improve the accuracy in determining the condition of the road surface. Note that the relation between the second threshold TL2 and the first threshold TL1 only has to be such that the second threshold TL2 is relatively larger than the first threshold TL1, and does not have to be determined based on absolute values.

First Embodiment

An ECU 4 according to a first embodiment includes: a road surface height measurer 41 which measures road surface heights at three or more points along a vehicle-width direction in front of a tire 15 mounted on a wheel 16; a position detector 42 which detects a position at which a difference of the road surface height from an adjacent road surface height is equal to or larger than a predetermined threshold among the road surface heights at three or more points measured by the road surface height measurer 41; and a corrector 43 which corrects the road surface height at a position at which the difference detected by the position detector 42 is equal to or larger than the predetermined threshold to a predetermined height.

In this way, the ECU 4 according to the first embodiment measures road surface heights at three or more points along the vehicle-width direction in front of the tire 15 mounted on the wheel 16, and corrects a road surface height at a position at which the difference from an adjacent road surface height is equal to or larger than the predetermined threshold among the measured road surface heights at three or more points to the predetermined height. Hence, since the ECU 4 can appropriately correct road surface heights, it is possible to improve a detection accuracy in detecting the condition of the road surface.

As described above, the ECU 4 according to the first embodiment measures road surface heights at three or more points, and corrects a road surface height at a position at which the difference from an adjacent road surface height is equal to or larger than the predetermined threshold among the measured road surface heights at three or more points to a predetermined height.

Hence, since the ECU 4 according to the first embodiment can appropriately correct road surface heights, it is possible to improve a detection accuracy in detecting the condition of the road surface, and to thus prevent the ride comfort of an occupant in a car from deteriorating. Specifically, the ECU 4 can appropriately correct road surface heights even when woven wires or stones are stacked on the road surface.

In addition, in the first embodiment, the ECU 4 may further include a road surface condition determiner 44 which excludes a value of the road surface height at the position at which the difference detected by the position detector 42 is equal to or larger than the predetermined threshold, and determines the condition of the road surface based on the road surface heights at positions at each of which the difference from an adjacent road surface height is smaller than the predetermined threshold.

In this way, the ECU 4 according to the first embodiment detects a position at which the difference from an adjacent road surface height is equal to or larger than the predetermined threshold, excludes a value of the road surface height at the position at which the detected difference is equal to or larger than the predetermined threshold, and can thus determine the condition of the road surface based on the road surface heights at positions at each of which the difference from an adjacent road surface height is smaller than the predetermined threshold.

In this case, the corrector 43 corrects the excluded value of the road surface height at the position at which the difference is equal to or larger than the predetermined threshold (for example, the first threshold) based on the road surface heights at positions at each of which the difference is smaller than the predetermined threshold (for example, the first threshold).

Moreover, for the case where there is one point at which the difference from an adjacent road surface height is equal to or larger than the predetermined threshold and the case where there are two points at each of which the difference from an adjacent road surface height is equal to or larger than the predetermined threshold, the position detector 42 may be such that a second threshold for detecting the differences in road surface height at two points is set to be larger than the first threshold for detecting the difference in road surface height at one point.

The position detector 42 can make each of values of road surface heights at adjacent two points less likely to be detected as outlier points by making the second threshold TL2 for detecting differences in road surface height at two points larger than the first threshold TL1 for detecting a difference in road surface height at one point as described above.

In this way, the road surface condition determiner 44 can appropriately determine the condition of the road surface by making two outlier points less likely to be excluded than the case of one outlier point.

In addition, the corrector 43 can correct the road surface height at the position at which the difference from an adjacent road surface height is equal to or larger than the predetermined threshold to a deformation limit of the tire 15 (a limit value up to which a tire deformation model is deformable). Furthermore, in this case, as the deformation limit of the tire 15, a gradient between adjacent road surface heights can be applied.

In this way, it is possible to reduce measurement errors and improve a detection accuracy in detecting the condition of the road surface in a case where a road surface height at a measurement point exceeds the deformation limit of the tire 15 due to woven wires or stones even when the road surface height at the measurement point is correct, for example.

Here, the deformation limit of the tire 15 may be changed depending on the type of the tire 15. For example, summer tires for summer require high air pressures in general, while winter tires for winter relatively require lower air pressures than those of the summer tires. For this reason, the gradient as the deformation limit may be set lower for summer tires for summer. Alternatively, the deformation limit of the tire 15 may be set depending on the aspect ratio of the tire 15.

In addition, when the gradient between adjacent road surface heights is applied to the deformation limit of the tire 15, the gradient between road surface heights may be calculate from distribution of weight of the vehicle V, for example, to set the deformation limit of the tire 15 to be variable.

The deformation limit may be set to be variable depending on the weight distribution of the vehicle V by, for example, setting the gradient as the deformation limit for the tire 15 on the driver's seat side to be larger than the deformation limit for the tire 15 on the passenger's seat side depending on the distribution of weight of the vehicle V. In this way, the ECU 4 can determine the condition of the road surface with high accuracy. By the way, it is possible to know the load applied to each wheel (tire 15) by using the displacement (degree of depression) of the suspension (damper D) at a flat place and a result of measuring the road surface, and it is also possible to set the deformation limit of each tire 15 based on this load.

In addition, for example, due to the air pressure of the tire 15, the higher the air pressure is, the smaller the amount of change of the tire 15 is. For this reason, the gradient as the deformation limit of the tire 15 can be set to be low. Note that the air pressure of the tire 15 can be obtained any time if the vehicle is equipped with a tire pressure monitoring system, TPMS.

In addition, when the vehicle V is being braked, the corrector 43 may set a higher gradient as the deformation limit of the tires 15 for the wheels 16 of the front wheels than those of the rear wheels. Note that in a case where the sensors 3 are provided only for the front wheels, this configuration can be applied as it is.

In addition, a difference may be set in gradient between the wheels 16 that come on the inner wheel side when turning and the wheels 16 that come on the outer wheel side when turning, such that the value of the gradient as the deformation limit of the tire 15 on the outer wheel side is higher than that on the inner wheel side. Note that this configuration can be applied as it is during normal driving, and the value of the gradient can be set higher in the direction in which centrifugal force acts during turning a curve.

Second Embodiment

An ECU 4 according to a second embodiment includes: a road surface height measurer 41 which measures road surface heights at three or more points along a vehicle-width direction in front of a tire mounted on a wheel 16; a position detector 42 which detects a position at which a difference of the road surface height from an adjacent road surface height is equal to or larger than a predetermined threshold among the road surface heights at three or more points measured by the road surface height measurer 41; and a road surface condition determiner 44 which excludes a value of the road surface height at the position at which the difference detected by the position detector 42 is equal to or larger than the predetermined threshold, and determines a condition of the road surface based on the road surface heights at positions at each of which the difference from an adjacent road surface height is smaller than the predetermined threshold.

In this way, the ECU 4 according to the second embodiment detects the position at which the difference from an adjacent road surface height is equal to or larger than the predetermined threshold, excludes a value of the road surface height at the position at which the detected difference is equal to or larger than the predetermined threshold, and can thus determine the condition of the road surface based on the road surface heights at positions at each of which the difference from an adjacent road surface height is smaller than the predetermined threshold.

As described above, the ECU 4 according to the second embodiment excludes the value of the road surface height at a position at which the difference detected by the position detector 42 is equal to or larger than the predetermined threshold, and determines the condition of the road surface based on the road surface heights at positions at each of which the difference from an adjacent road surface height is smaller than the predetermined threshold.

In this way, since the ECU 4 according to the second embodiment excludes a value of the road surface height of which the difference in road surface height is equal to or larger than the predetermined threshold, and can thus determine the condition of the road surface based on the road surface heights of each of which the difference from an adjacent road surface height is smaller than the predetermined threshold, and the accuracy in detecting the condition of the road surface can thus be improved.

In addition, the ECU 4 can determine a road surface height which is desired to be deleted in consideration of the entire condition of the road surface even when the road surface height is correct at a measurement point due to a leaf or dust, and can thus reduce a measurement error in the condition of the road surface. Since the ECU 4 can reduce a measurement error in the condition of the road surface, it is possible to improve the accuracy in detecting the road surface condition. In this way, since the ECU 4 can improve the detection accuracy in detecting the condition of the road surface, it is possible to prevent the ride comfort of an occupant in a car from deteriorating.

In particular, for the case where there is one point at which the difference from an adjacent road surface height is equal to or larger than the predetermined threshold and the case where there are two points at each of which the difference from an adjacent road surface height is equal to or larger than the predetermined threshold, the position detector 42 may be such that a larger second threshold for detecting the differences in road surface height at two points is set to be larger than the first threshold for detecting the difference in road surface height at one point.

As described above, the position detector 42 can make each of values of road surface heights at adjacent two points less likely to be detected as an outlier point by making the second threshold TL2 for detecting differences in road surface height at two points larger than the first threshold TL1 for detecting a difference in road surface height at one point.

In this way, the road surface condition determiner 44 can appropriately determine the condition of the road surface by making two outlier points less likely to be excluded than the case of one outlier point.

In addition, the road surface condition determiner 44 may be provided with a noise removal function. For example, a predetermined outlier point may be removed by using information in the past and applying a low-pass filter which cuts off high-frequency components. In addition, an outlier point may be removed from continuity of measurement points by using temporal (time-series) information in the past. In addition, the road surface condition determiner 44 may be provided with a noise removal function including time-axis information based on speed information on the vehicle V.

What is claimed is:

1. An active suspension device that is a control device for a variable damping force damper provided for damping a relative vibration between a vehicle body and a wheel, comprising:
    a road surface height measurer which measures road surface heights at three or more points along a vehicle-width direction in front of a tire mounted on the wheel;
    a position detector which detects a position at which a difference of the road surface height from an adjacent road surface height is equal to or larger than a predetermined threshold among the road surface heights at three or more points measured by the road surface height measurer; and
    a corrector which corrects the road surface height at a position at which the difference detected by the position detector is equal to or larger than the predetermined threshold to a predetermined height.

2. The active suspension device according to claim 1, further comprising:
    a road surface condition determiner which excludes a value of the road surface height at the position at which the difference detected by the position detector is equal to or larger than the predetermined threshold, and determines a condition of the road surface based on the road surface heights at positions at each of which the difference from an adjacent road surface height is smaller than the predetermined threshold, wherein
    the corrector corrects the excluded value of the road surface height at the position at which the difference is equal to or larger than the predetermined threshold based on the road surface heights at positions at each of which the difference from an adjacent road surface height is smaller than the predetermined threshold.

3. The active suspension device according to claim 2, wherein
    for a case where there is one point at which the difference from an adjacent road surface height is equal to or larger than the predetermined threshold and a case where there are two points at each of which the difference from an adjacent road surface height is equal to or larger than the predetermined threshold, the position detector is such that a second threshold for detecting the differences in road surface height at two points is larger than a first threshold for detecting the difference in road surface height at one point.

4. The active suspension device according to claim 3, wherein
    the first threshold and the second threshold are variable.

5. The active suspension device according to claim 1, wherein
    the corrector corrects the road surface height at the position at which the difference is equal to or larger than the predetermined threshold to a limit value up to which the tire is deformable.

6. A control device for suspension comprising:
a sensor which acquires information on the road surface heights at three or more points; and
the active suspension device according to claim 1.

* * * * *